Nov. 12, 1963  C. SCHULZE  3,110,191
GEAR CHANGE MECHANISM
Filed Aug. 31, 1961  5 Sheets-Sheet 5
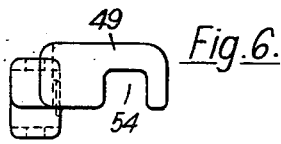
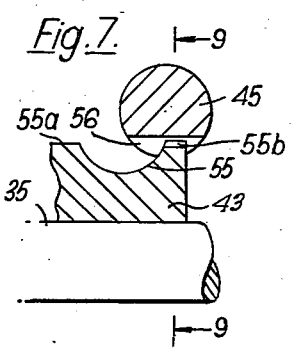
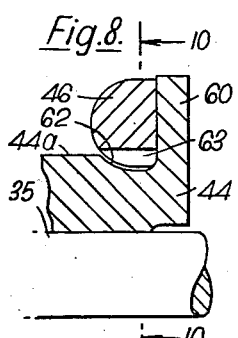
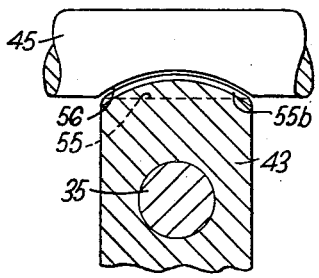
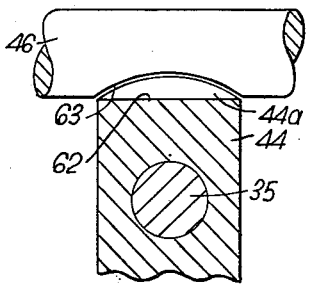
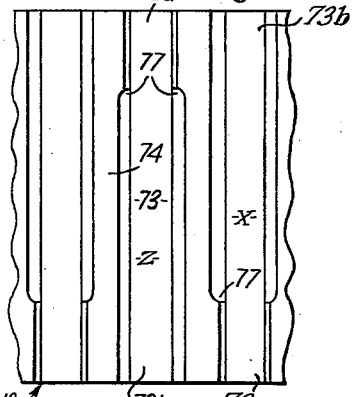
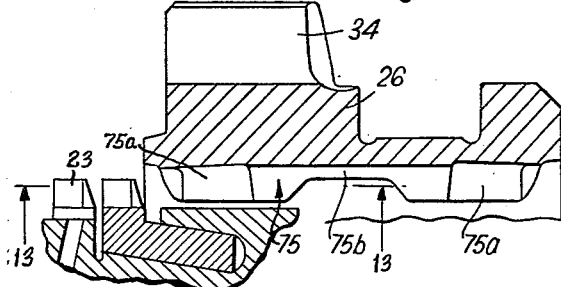
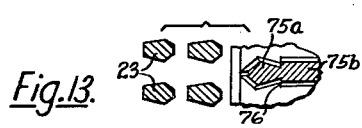
Inventor
Carl Schulze
BY
A. M. Neiter
Attorney United States Patent Office 3,110,191
Patented Nov. 12, 1963

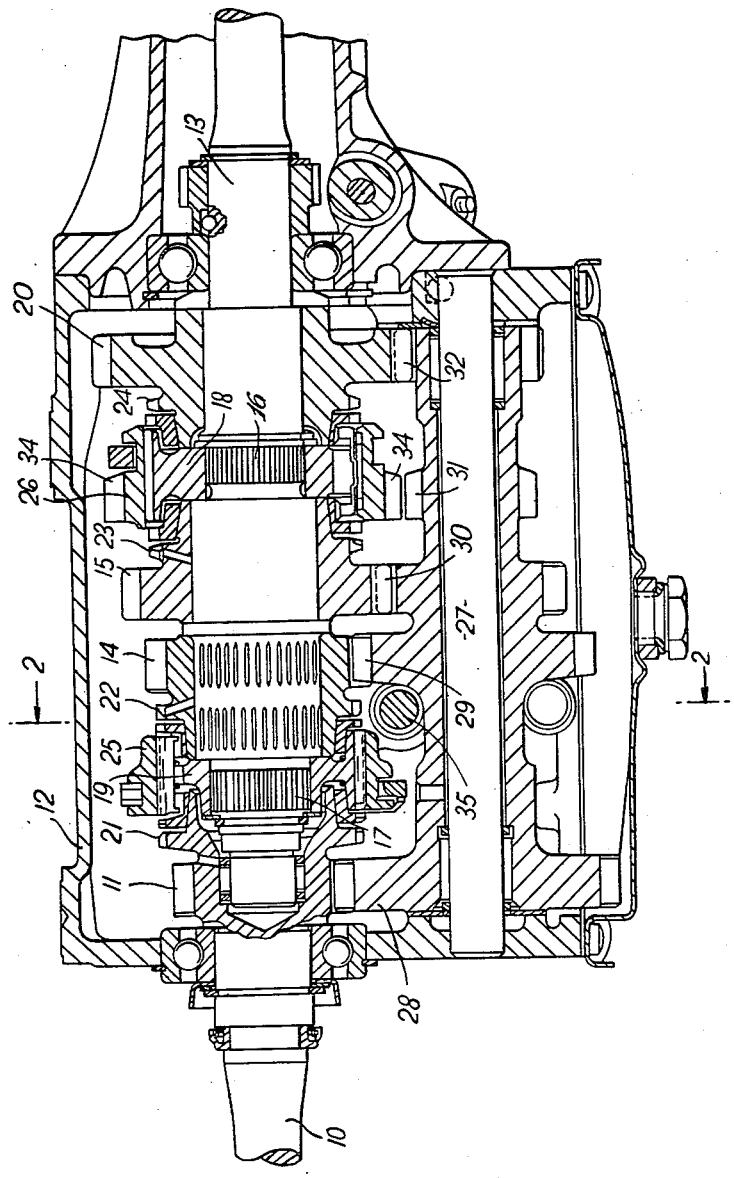

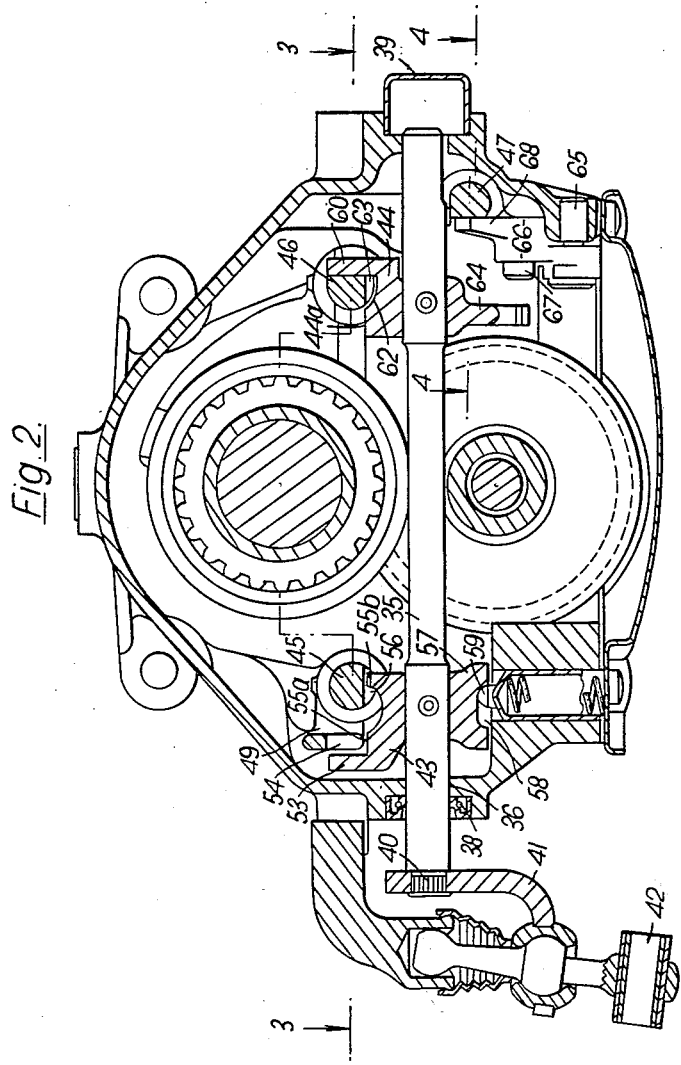

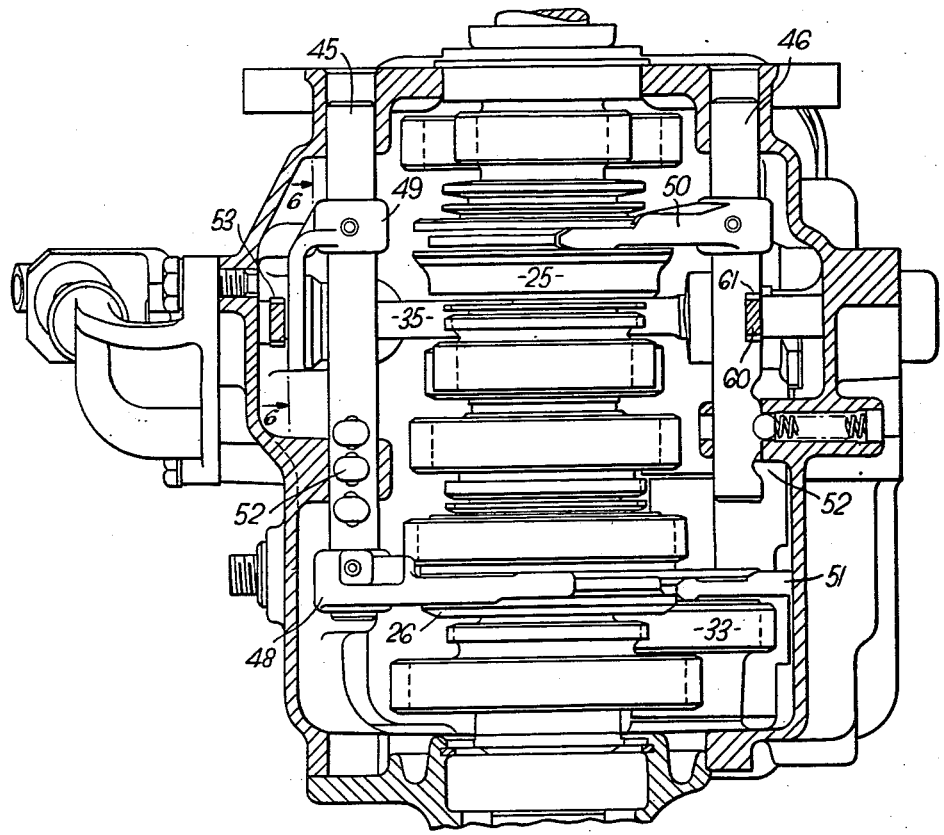

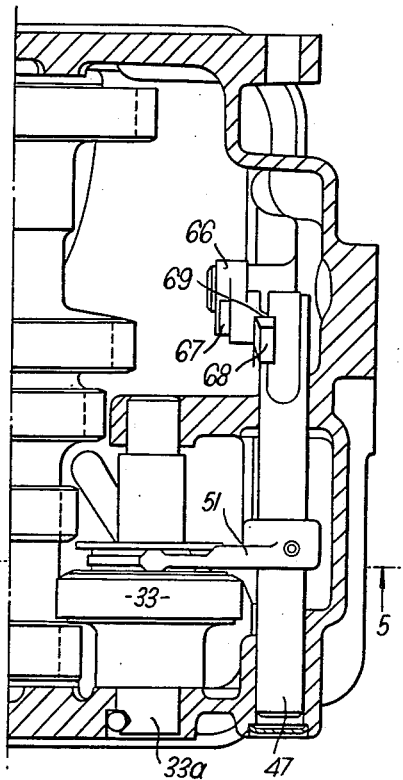
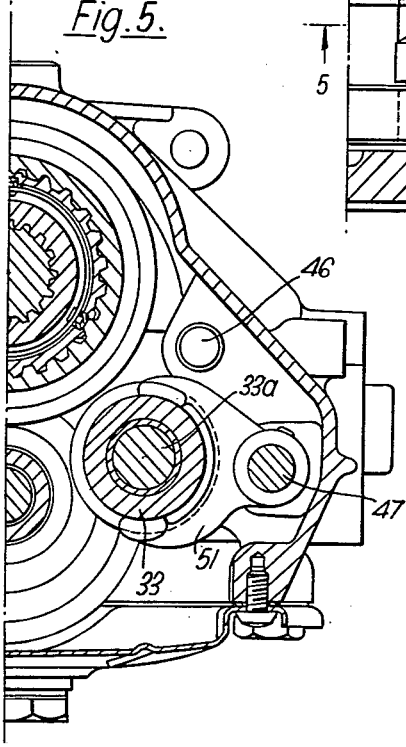

3,110,191
GEAR CHANGE MECHANISM
Carl Schulze, Wiesbaden, Germany, assignor to General Motors Corporation, Detroit, Mich., a corporation of Delaware
Filed Aug. 31, 1961, Ser. No. 135,312
Claims priority, application Germany Sept. 13, 1960
9 Claims. (Cl. 74—333)

This invention relates to gear change mechanism comprising a rotary member having an externally splined part, two pinions respectively located on opposite axial sides of the member, and an externally toothed clutch sleeve having an internally splined part in engagement with the splined part of the member and axially slidable between a centre position in which the external teeth are adapted to mesh with a third pinion and two axially outer positions in which the internal splines mesh respectively with the two pinions.

Such a mechanism is often used in a motor vehicle gear box; the two pinions on opposite axial sides of the member mesh with layshaft pinions and, when engaged by the clutch sleeve, respectively form part of the drive train of two different gear ratios, while the third pinion is a reverse gear idler pinion movable into engagement with both the external teeth of the coupling sleeve, when in its centre position, and with a layshaft pinion so as to establish reverse drive.

When the clutch sleeve is in its centre position and the mechanism is transmitting torque through the third pinion, there is sometimes a tendency for the clutch sleeve to move axially out of engagement with the third pinion. This tendency may be counteracted by shaping the splined parts of the rotatory member and clutch sleeve so that the walls of the slots between the splines of one splined part are curved or inclined to axis of the rotatory member.

The formation of slots having curved or inclined walls is a difficult and complicated production engineering operation.

In the present invention the walls of the slots are both straight and parallel to the axis of the rotatory member, and can be formed by a simple milling operation.

In a gear mechanism according to this invention the slots between the splines of one part have wide and narrow parts having straight walls parallel to the axis of the member and extending respectively to opposite axial ends of the part, and the wide parts of some slots (preferably alternate slots) extend to one axial end and the wide parts of the other slots extend to the opposite axial end; the splines of the second splined part, when the clutch sleeve is in the centre position with the external teeth in engagement with the third pinion and torque being transmitted, engage the spline shoulders between the wide and narrow parts of the slots between the splines of the first part to restrict axial movement of the clutch sleeve.

The slots having the wide and narrow parts are preferably formed in the rotatory member.

The scope of the invention is defined by the appended claims; and how it may be performed is hereinafter particularly described with reference to the accompanying drawings, in which:

FIGURE 1 is a longitudinal vertical cross section of a change-speed transmission with four forward and one reverse speeds;

FIGURE 2 is a vertical transverse cross section on the line 2—2 of FIGURE 1;

FIGURE 3 is a horizontal cross-section on the line 3—3 of FIGURE 2;

FIGURE 4 is a horizontal cross section of one half of the transmission on the line 4—4 of FIGURE 2;

FIGURE 5 is a vertical transverse cross section on the line 5—5 of FIGURE 4;

FIGURE 6 is a side view of a part secured to a shift rail and viewed in the direction of the arrow 6 of FIGURE 3;

FIGURES 7 and 8 are enlargements of two parts shown in FIGURE 2;

FIGURES 9 and 10 are sections on the lines 9—9 and 10—10 in FIGURES 7 and 8 respectively;

FIGURE 11 is a developed view of splines on one part;

FIGURE 12 is a side view of a co-operating spline and clutch tooth on line 12—12 of FIG. 1; and FIGURE 13 is a section on the line 13—13 in FIGURE 12.

Referring to FIGURE 1, the input shaft 10 is integral with or rigidly connected to a main top-speed gear 11 and is carried by a conventional bearing fitted into the front wall of the case 12. A co-axial mainshaft 13 is piloted at its front end in a roller bearing in the clutch gear 11 and is supported in a mainshaft rear bearing in the case 12. Third and second speed gears 14 and 15 respectively, are freely and rotatably journaled on the mainshaft 13. The mainshaft 13 is also provided with two splined portions 16 and 17 on which rotatory members in the form of hubs 18 and 19 of the first and second speed and third and top speed synchronising clutch assemblies are splined and retained against axial displacement. The gears 11, 14, 15 and 20 have clutch teeth 21, 22, 23, 24. Clutch sleeves 25 and 26 are slidably engaged with external splines on the hubs 19 and 18, respectively. With this arrangement, the clutch or coupling sleeve 26 can be shifted into mesh either with the clutch teeth 24 on the first speed gear 20 or with the clutch teeth 23 on the second speed gear 15. The sleeve 25 can be meshed either with the clutch teeth 22 on the third speed gear 14 or with the clutch teeth 21 on the top speed gear 11. Conventional synchronizer devices are inserted between the clutch sleeves 25 and 26 and the clutch teeth 21, 22 and 23. These synchronizer devices do not constitute part of this invention and are therefore not described.

A layshaft or countershaft 27 is secured in the case 12 and carries rotatably on needle bearings an assembly of gears 28, 29, 30, 31 and 32. The gear 28 is in constant mesh with the gear 11, the gear 29 is in constant mesh with the third speed gear 14, the gear 30 is in constant mesh with the second speed gear 15 and the gear 32 is in constant mesh with the first speed gear 20. A reverse gear 34 is formed on the external periphery of the clutch sleeve 26. A reverse gear idler pinion 33 (FIGURES 4 and 5) is slidably and rotatably mounted on an idler shaft 33a secured in the case 12.

Movement of the third and fourth speed clutch or coupling sleeve 25 is effected by a shift fork 50 (FIGURE 3) secured to a third and fourth speed shift rail 46 slidably mounted in the case 12 on the same side of the mainshaft 13 as the reverse idler shaft 33a. Movement of the first and second speed clutch sleeve 26 is effected by a shift fork 48 secured to a first and second speed shift rail 45 slidably mounted in the case 12 on the opposite side of the mainshaft 13 to the rail 46. Each of the shift rails 45 and 46 has three grooves 52, corresponding to the three positions of the corresponding shift fork and clutch sleeve, one of which grooves is engageable by a spring loaded detent ball.

Movement of the reverse idler gear pinion 33 is effected by a shift fork 51 secured to a reverse shift rail 47 (FIGURE 4) slidably mounted in the case 12 on the same side of the mainshaft 13 as the rail 46.

A transverse selector shaft 35 (FIGURE 2) is slidably and rotatably supported in bores 36 and 37 in opposite side walls of the case 12. A conventional seal 38 prevents oil leakage through the bore 36. A metallic cap 39 force-fitted into an enlarged portion of the bore 37, provides an oil-tight sealing. A lever arm 41 is connected to the selector shaft 35 at 40 outside the case 12 and is universally connected to a universally mounted lever 42. The latter is movable to rotate and slide the shaft 35 by conventional gearshift control mechanism (not shown).

The side of the shift rail 46 has a recess 61 (FIGURE 3) with which can engage a shift cam 60 on an arm 44 secured to the shaft 35. A finger 49 is secured to the shift rail 45 and extends parallel thereto and spaced therefrom. The finger 49 has a recess 54 (FIGURE 6) with which can engage a shift cam 53 on an arm 43 secured to the shaft 35.

The arm 43 on the shaft 35 has a rounded interlock groove 55 adjacent the shift cam 53 and the shift rail 45 has a rounded recess 56 shaped to fit correspondingly rounded external surfaces of parts 55a and 55b of the arm 43. The arm 44 on the shaft 35 has a rounded interlock groove 62 adjacent the shift cam 60 and the shift rail 46 has a rounded recess 63 shaped to fit the external surface 44a of the arm 44. When the shaft 35 is in the position shown in FIGURE 2 with the cam 60 engaged in the recess 61, the rounded groove 62 underlies the rail 46 to permit movement thereof between third, neutral and fourth speed positions. At the same time, the cam 53 is out of engagement with the recess 54 and movement of the rail 45 from neutral position is prevented by engagement of the arm 43 in the recess 56.

The arm 43 has a lower portion 57 in which there is a transverse groove 58 engaged by a spring-pressed detent 59. This permits free longitudinal movement of the shaft 35 between the limits of the ends of the groove 58— that is from the position shown in FIGURE 2 to a position in which the cam 53 is engaged in the recess 54. In this position, the rounded groove 55 on the arm 43 underlies the rail 45 to permit movement of the rail 45 between first, neutral and second speed positions. At the same time, the cam 60 is out of engagement with the recess 61 and movement of the rail 46 from neutral position is prevented by engagement of the arm 44 in the recess 63.

A reverse shift lever 66 is pivoted on a transverse pin 65 in the case 12 (FIGURE 2). The lever 66 has a shift cam 68 at its upper end engaged in a recess 69 in the reverse shift rail 47 (FIGURE 4). The lever 66 also has a projecting pin 67 which may be engaged between the limbs of a depending bifurcated arm 64 of the arm 44 on the shaft 35. In the two positions of the shaft 35 referred to above, the bifurcated arm 64 does not engage the pin 67.

The shaft 35 is movable beyond the position set by the end of the groove 58 against extra resistance provided by the spring-pressed detent 59 which must be depressed before such further movement can occur. When the shaft 35 is in such a position that the pin 67 is engaged between the limbs of the bifurcated arm 64, the reverse shift rail 47 is movable from neutral to reverse position by pivotation of the lever consequent upon rotation of the shaft 35. At the same time, the arm 44 remains in the recess 63 of the rail 46 preventing movement thereof and the portion 55a of the arm 43 between the groove 55 and cam 53 enters the recess 56 to prevent movement of the rail 45. The cam 53 passes out of engagement with the recess 54 to lie between the finger 49 and the rail 45.

In each position of the shaft 35, rotation of the shaft causes longitudinal displacement of a shift rail and its shift fork.

The transmission is shown in FIGURES 1, 2 and 3 in its neutral position and the selector shaft 35 is in position to select third or fourth speed, to which position it is urged by conventional spring means (not shown). The detent 59 is in contact with one end of the groove 58 (FIGURE 2). The part 55b of the arm 43 is engaged in the recess 56 of the shift rail 45 and the cam 53 is not in engagement with the finger 49. Turning of the selector shaft 35 effected by the lever 41 does not cause the shift rail 45 to move lengthwise since the part 55b is correspondingly curved to the recess 56. The cam 60 of the arm 44 is in engagement with the recess 61 in the shift rail 46, the groove 62 underlies the shift rail 46 and bifurcated portion 64 does not engage the pin 67 on the lever 66. Turning of the selector shaft 35, after the resistance of the detent engaging the groove 52 has been overcome, causes a longitudinal displacement of the shift rail 46 with its fork 50 to engage third or fourth speed.

If the selector shaft 35 is shifted longitudinally until the detent 59 contacts the other end of the groove 58, the groove 55 of the arm 43 underlies the shift rail 45. Simultaneously, the cam 53 of the arm 43 is engaged in the recess 54 of the finger 49. The cam 60 of the arm 44 is disengaged from the recess 61 of the shift rail 46, the bifurcated arm 64 does not engage the pin 67 of the lever 66 and the part 44a of the arm 44 enters the recess 63.

Turning of the selector shaft 35 by the lever 41, after the resistance of the detent engaging the groove 52 of the shift rail 45 has been overcome, causes a longitudinal displacement of the shift rail 45 and its fork 48 to engage first or second speed. Undesired displacement of the shift rail 46 is prevented by the engagement of the part 44a of the arm 44 in the recess 63; rotation of the shaft 35 does not move the rail 46 since the part 44a is correspondingly rounded to the part 63.

Upon a further longitudinal displacement of the selector shaft 45, the detent 59 is pressed out of the groove 58 against its spring. The resistance of the detent 59 prevents unintentional displacement of the shaft 35. The bifurcated arm 64 of the arm 44 engages the pin 67 of the lever 66. The cam 60 of the arm 44 is out of engagement with the recess 61 in the shift rail 46 but the part 44a of the arm 44 remains in the recess groove 63 of the shift rail 46 to prevent longitudinal displacement thereof. The cam 53 of the arm 43 lies between the shift rail 45 and the finger 49, and the portion 55a of the arm 43 engages the groove 56 of the shift rail 45 to prevent longitudinal displacement thereof; rotation of the shaft 35 does not however move the rail 45 since the part 44a is correspondingly rounded to the recess 56. Rotation of the selector shaft 35 in this position causes pivotation of the lever 66 about the pin 65 and the cam 68 causes longitudinal movement of the rail 47 and its fork 51 to engage reverse.

Undesired longitudinal movement of the rail 47 in the forward speed positions of the shaft 35 may be prevented by interergaging formations on the rail 47 and shaft 35.

In order to minimise the risk of the coupling sleeve 26 moving axially when reverse gear is engaged by meshing of the external teeth 34 with the pinions 31 and 33, the splines 75 on the coupling sleeve 26 are shaped as shown in FIGURES 12 and 13, while the external splines 74 on the hub 18 are shaped as shown in FIGURE 11.

The slots 73 between the external splines 74 on the hub 18 have narrow and wide parts 73a and 73b respectively extending to opposite axial ends of the hub 18; the wide parts 73b of alternate slots Z extend to one axial end and the wide parts 73b of intervening slots X extend to the opposite axial end of the hub.

The splines on the hub 18 are formed in a conventional manner during manufacture—that is so that all the slots between the splines are narrow as at 73a. The wide parts 73b are thereafter formed by widening the slots by milling, preferably in a duplex machine.

The internal splines 75 on the coupling sleeve 26 have narrow axial end portions 75a and wide centre portions 75b, the latter being narrow enough to slide through the narrow parts 73a of the slots. When the coupling sleeve 26 is in its centre position (FIGURE 1) the axial length of the portions is such that the narrow end portion 75a at one end of each spline fits in a narrow slot part 73a, while the wide centre portion 75b and the narrow end portion 75a at the opposite end of the same spline fit in a wide flat part 73b.

When the coupling sleeve 26 is in the centre position and the reverse gear idler pinion 33 is meshing with the teeth 34 and pinion 31, any load forces the splines 75 towards the walls of the slots 73. If the coupling sleeve 26 tends to move axially, shoulders 76 which are formed between the narrow and wide portions 75a and 75b of the internal splines and may be about ten thousandths but are exaggerated in FIGURE 13, engage shoulders 77 between the narrow and wide parts 73a and 73b of the slots between the external splines 74 to restrict this movement. When there is no load being transmitted through the coupling sleeve 26, the shoulders 76 slide over the shoulders 77 to permit the wide centre portions 75b of the interal splines to enter the narrow slot parts 73a, thereby allowing axial movement of the coupling sleeve. This permits the narrow axial end portions 75a of the internal splines 75 to engage the coupling teeth 23 or 24 depending on the direction of axial movement.

In order to minimise the risk of accidental disengagement of the narrow end portions 75a from the coupling teeth 23 or 24 the side surfaces of the portions 23, 24 and 75a are inclined to the axis of the coupling sleeve 26 so that when the gear mechanism is loaded there is an axial force component tending to hold the coupling sleeve splines in engagement with the coupling teeth 23 or 24.

I claim:

1. A gear change mechanism comprising a rotatory member having an externally splined part, two pinions respectively located on opposite axial sides of said member, a third pinion, and an externally toothed clutch sleeve having an internally splined part in engagement with said externally splined part of said member and axially slidable between a central position in which said external teeth of said sleeve are adapted to mesh with said third pinion and two axially outer positions in which said internally splined part meshes respectively with said two pinions, the slots between the splines of one of said splined parts having wide and narrow parts, each of said wide and narrow parts having straight walls parallel to the axis of said rotatory member, each of said wide and narrow parts extending respectively to opposite axial ends of said splined part, said wide parts of some of said slots extending to one axial end of said slots and the wide parts of the remainder of said slots extending to the opposite axial end of said slots, said splines of the other of said splined parts, when said clutch sleeve is in said central position with said external teeth in engagement with said third pinion and torque being transmitted, engaging the spline shoulders between said wide and narrow parts of said slots between the splines of the first of said splined parts to restrict axial movement of said clutch sleeve.

2. A gear change mechanism comprising a rotatory member having external splines, two pinions respectively located on opposite axial sides of said member, a third pinion, and an externally toothed clutch sleeve having internal splines in engagement with said external splines, and axially slidable between a central position in which said external teeth of said sleeve are adapted to mesh with said third pinion and two axially outer positions in which said internal splines mesh respectively with said two pinions, the slots between the external splines having wide and narrow parts, each of said wide and narrow parts having straight walls parallel to the axis of said rotatory member, each of said wide and narrow parts extending respectively to opposite axial ends of said external splines, said wide parts of some of said slots extending to one axial end of said slots and the wide parts of the remainder of said slots extending to the opposite axial end of said slots, said internal splines, when said clutch sleeve is in said central position with said external teeth in engagement with said third pinion and torque being transmitted, engaging the spline shoulders between said wide and narrow parts of said slots between the external splines to restrict axial movement of said clutch sleeve.

3. A gear change mechanism comprising a rotatory member having external splines, two pinions respectively located on opposite axial sides of said member, a third pinion, and an externally toothed clutch sleeve having internal splines in engagement with said external splines and axially slidable between a central position in which said external teeth of said sleeve are adapted to mesh with said third pinion and two axially outer positions in which said internal splines mesh respectively with said two pinions, the slots between the external splines having wide and narrow parts, each of said wide and narrow parts having straight walls parallel to the axis of said rotatory member, each of said wide and narrow parts extending respectively to opposite axial ends of said splines, said wide parts of alternate slots extending to one axial end of said slots and the wide parts of the intervening slots extending to the opposite axial end of said slots, said internal splines, when said clutch sleeve is in said central position with said external teeth in engagement with said third pinion and torque being transmitted, engaging the spline shoulders between said wide and narrow parts of said slots between the external splines to restrict axial movement of said clutch sleeve.

4. A gear change mechanism comprising a rotatory member having external splines, two pinions respectively located on opposite axial sides of said member, a third pinion, and an externally toothed clutch sleeve having internal splines in engagement with said external splines and axially slidable between a central position in which said external teeth of said sleeve are adapted to mesh with said third pinion and two axially outer positions in which said internally splined part meshes respectively with said two pinions, the slots between said external splines having wide and narrow parts, each of said wide and narrow parts having straight walls parallel to the axis of said rotatory member, each of said wide and narrow parts extending respectively to opposite axial ends of said splines, said wide parts of alternate slots extending to one axial end of said slots and the wide parts of the intervening slots extending to the opposite axial end of said slots, said internal splines having narrow axial end portions and wide central portions, said end portion at one end of each internal spline fitting in a narrow part of a slot and the central portion and other end portion fitting in the wide part of said slot, said wide portions being slidable in said narrow parts of said slot, the shoulders between said wide and narrow portions when said sleeve is in said central position with said external teeth in engagement with said third pinion and torque being transmitted, engaging the spline shoulders between said wide and narrow parts of said slots between said external splines to restrict axial movement of said clutch sleeve.

5. A motor vehicle gear box comprising an input shaft; output shaft means having external splines, the slots between said external splines having wide and narrow parts, said wide and narrow parts having straight walls parallel to the axis of said shaft and extending respectively to opposite axial ends of said splines, and said wide parts of alternate slots extending to one of said axial ends and the wide parts of the intervening slots to the other of said axial ends; a first pinion mounted on said input shaft to rotate with said input shaft; second and third pinions rotatably mounted on said output shaft on opposite sides of said external splines and having clutch teeth; a layshaft; three gear wheels mounted on said layshaft to mesh respectively with said first, second and third pinions so as to transmit rotatory movement from said first pinion to said second and third pinions; a clutch sleeve having external teeth and internal splines, said internal splines being in engagement with said external splines and said sleeve being slidable between a centre position in which said internal splines are out of engagement with said clutch teeth of said second and third pinions and two axially outer positions in which said internal splines mesh respectively with said clutch teeth of said second and third pinions, said internal splines having narrow axial end portions and wide centre portions, said wide centre portions being slidable in said narrow parts of said slots, said narrow axial end portion at one end of each of said internal splines fitting in said narrow parts of one of said slots and said other narrow axial end portion and said wide centre portion of said internal splines fitting in said wide part of said slot, whereby, when said coupling sleeve is in said centre position, the shoulders between said narrow and wide portions of said internal splines are adapted to engage the shoulders between said wide and narrow parts of said slots to restrict axial movement of said clutch sleeve; a reverse gear wheel mounted on said layshaft; and an idler reverse pinion movable into engagement with said reverse gear wheel and said external teeth on said clutch sleeve, when in its centre position, to establish reverse drive.

6. A motor vehicle gear box comprising an input shaft; output shaft means having external splines, the slots between said external splines having wide and narrow parts, said wide and narrow parts having straight walls parallel to the axis of said shaft and extending respectively to opposite axial ends of said external splines, and said wide parts of alternate slots extending to one of said axial ends and the wide parts of the intervening slots to the other of said axial ends; a first pinion mounted on said input shaft to rotate with said input shaft; second and third pinions rotatably mounted on said output shaft on opposite sides of said external splines and having clutch teeth with interlock means; a layshaft; three gear wheels mounted on said layshaft to mesh respectively with said first, second and third pinions so as to transmit rotatory movement from said first pinion to said second and third pinions; a clutch sleeve having external teeth and internal splines, said internal splines being in engagement with said external splines and said sleeve being slidable between a centre position in which said internal splines are out of engagement with said clutch teeth of said second and third pinions and two axially outer positions in which said internal splines mesh respectively with said clutch teeth of said second and third pinions, said internal splines having narrow axial end portions and wide centre portions, said wide centre portions being slidable in said narrow parts of said slots, said narrow axial end portion at one end of each of said internal splines fitting in said narrow part of one of said slots and said other narrow axial end portion and said wide centre portion of said internal spline fitting in said wide part of said slot, whereby, when said clutch sleeve is in said centre position, the shoulders between said narrow and wide portions of said internal splines are adapted to engage the shoulders between said wide and narrow parts of said slots to restrict axial movement of said clutch sleeve, said narrow end portions having surfaces inclined to the shaft axis such that when said member is in said outer axial positions in contact with said interlock means of said clutch teeth there is an axial force tending to hold said clutch member in said positions; a reverse gear wheel mounted on said layshaft; and an idler reverse pinion movable into engagement with said reverse gear wheel and said external teeth on said clutch sleeve when in its centre position to establish reverse drive.

7. A gear change mechanism comprising an input shaft; output shaft means having external splines, the slots between said external splines having wide and narrow parts, said wide and narrow parts having straight walls parallel to the axis of said shafts and extending respectively to opposite axial ends of said splines, and said wide parts of some slots extending to one of said axial ends and the wide parts of the other slots to the other of said axial ends; a first pinion mounted on said input shaft to rotate with said input shaft; second and third pinions rotatably mounted on said output shaft on opposite sides of said external splines and having clutch teeth; a layshaft; three gear wheels mounted on said layshaft to mesh respectively with said first, second and third pinions so as to transmit rotatory movement from said first pinion to said second and third pinions; a clutch sleeve having external teeth and internal splines, said internal splines being in engagement with said external splines and said sleeve being slidable between a centre position in which said internal splines are out of engagement with said clutch teeth of said pinions and two axially outer positions in which said internal splines mesh respectively with said clutch teeth of said second and third pinions, whereby said internal splines, when said clutch sleeve is in said centre position, engage the shoulders between said wide and narrow parts of said slots to restrict axial movement of said clutch sleeve; a reverse gear wheel mounted on said layshaft; and an idler reverse pinion movable into engagement with said reverse gear wheel and said external teeth on said clutch sleeve when in its centre position to establish reverse drive.

8. A motor vehicle gear box comprising an input shaft; output shaft means having external splines, the slots between said external splines having wide and narrow parts, said wide and narrow parts having straight walls parallel to the axis of said shafts and extending respectively to opposite axial ends of said splines, and said wide parts of alternate slots extending to one of said axial ends and the wide parts of the intervening slots to the other of said axial ends, said wide parts being formed by milling; a first pinion mounted on said input shaft to rotate with said input shaft; second and third pinions rotatably mounted on said output shaft on opposite sides of said external splines; a layshaft; three gear wheels mounted on said layshaft to mesh respectively with said first, second and third pinions so as to transmit rotatory movement from said first pinion to said second and third pinions; a clutch sleeve having external teeth and internal splines, said internal splines being in engagement with said external splines and said sleeve being slidable between a centre position in which said internal splines are out of engagement with said second and third pinions and two axially outer positions in which said interval splines mesh respectively with said second and third pinions, said internal splines having narrow axial end portions and wide centre portions, said wide centre portions being slidable in said narrow parts of said slots, said narrow axial end portion at one end of each of said internal splines fitting in said narrow part of one of said slots and said other narrow axial end portion and said wide centre portion of said internal spline fitting in said wide part of said slot, whereby, when said clutch sleeve is in said centre position the shoulders between said narrow and wide portions of said internal splines are adapted to engage the shoulders between said wide and narrow parts of said slots to restrict axial movement of said clutch sleeve; a reverse gear wheel mounted on said layshaft; and an idler reverse pinion movable into engagement with said reverse gear wheel and said external teeth on said clutch sleeve when in its centre position to establish reverse drive.

9. A gear change mechanism comprising a rotatory member having an externally splined part, two pinions respectively located on opposite axial sides of said member, and a sleeve having an internally splined part in engagement with said externally splined part of said member and axially slidable between a central position and two axially outer positions in which said internally splined part meshes respectively with said two pinions, the slots between the splines of one of said splined parts having wide and narrow parts, each of said wide and narrow parts having straight walls parallel to the axis of said rotatory member, each of said wide and narrow parts extending respectively to opposite axial ends of said splined part, said wide parts of some of said slots extending to one axial end of said slots and the wide parts of the remainder of said slots extending to the opposite axial end of said slots, said splines of the other of said splined parts, when said clutch sleeve is in said central position, engaging the spline shoulders between said wide and narrow parts of said slots between the splines of the first of said splined parts to restrict axial movement of said clutch sleeve.

References Cited in the file of this patent

UNITED STATES PATENTS

| | | |
|---|---|---|
| 1,923,379 | Hunt | Aug. 22, 1933 |
| 2,070,140 | Peterson et al. | Feb. 9, 1937 |
| 2,981,390 | Doerper | Apr. 25, 1961 |